(12) United States Patent
Oomura et al.

(10) Patent No.: US 10,227,700 B2
(45) Date of Patent: Mar. 12, 2019

(54) HYDROGEN PRODUCTION SYSTEM AND METHOD FOR PRODUCING HYDROGEN

(71) Applicant: Kabushiki Kaisha Toshiba, Minato-Ku (JP)

(72) Inventors: Hisao Oomura, Kawasaki (JP); Kazuya Yamada, Bunkyo (JP); Shinichi Makino, Yokohama (JP); Hisao Watanabe, Yokohama (JP); Seiji Fujiwara, Kamakura (JP); Shigeo Kasai, Kamakura (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 621 days.

(21) Appl. No.: 14/926,529

(22) Filed: Oct. 29, 2015

(65) Prior Publication Data

US 2016/0122882 A1 May 5, 2016

(30) Foreign Application Priority Data

Oct. 31, 2014 (JP) .................................. 2014-223044

(51) Int. Cl.
*C25B 1/04* (2006.01)
*C25B 1/10* (2006.01)
*C25B 15/08* (2006.01)

(52) U.S. Cl.
CPC .................. *C25B 1/04* (2013.01); *C25B 1/10* (2013.01); *C25B 15/08* (2013.01); *Y02E 60/364* (2013.01); *Y02E 60/366* (2013.01); *Y02P 20/129* (2015.11); *Y02P 20/133* (2015.11)

(58) Field of Classification Search
CPC .............. C25B 1/04; C25B 1/10; C25B 15/08
See application file for complete search history.

(56) References Cited

U.S. PATENT DOCUMENTS

2006/0065545 A1 3/2006 Balan et al.
2007/0000789 A1 1/2007 Libby et al.
2007/0217995 A1 9/2007 Matsumura et al.
(Continued)

FOREIGN PATENT DOCUMENTS

DE  10 2010 035 229 A1  3/2012
EP  1 354 850 A2  10/2003
EP  1 354 850 A3  10/2003
(Continued)

OTHER PUBLICATIONS

Extended European Search Report dated Mar. 2, 2016 in Patent Application No. 15192084.0.

*Primary Examiner* — Nicholas A Smith
(74) *Attorney, Agent, or Firm* — Oblon, McClelland, Maier & Neustadt, L.L.P.

(57) ABSTRACT

A hydrogen production system includes: a steam generator heating supplied raw water and generating steam; an electrolytic cell receiving the steam and generating hydrogen and oxygen through a high temperature electrolysis; a cooling unit cooling an unreacted part of the steam in the high temperature electrolysis and changing the unreacted part of the steam into steam condensate; a gas/liquid separator performing gas/liquid separation on the generated hydrogen and the generated steam condensate; a hydrogen compression unit compressing the separated hydrogen and transmitting thermal energy generated when the hydrogen is compressed, to the raw water; and a hydrogen storage unit storing the compressed hydrogen.

4 Claims, 2 Drawing Sheets

(56) References Cited

U.S. PATENT DOCUMENTS

2013/0126360 A1   5/2013   Ise et al.

FOREIGN PATENT DOCUMENTS

| JP | 5-9769 A | 1/1993 |
| JP | 6-163064 A | 6/1994 |
| JP | 2001-57222 A | 2/2001 |
| JP | 2004-197705 | 7/2004 |
| JP | 2009-71959 A | 4/2009 |
| JP | 2009-221045 | 10/2009 |
| JP | 2010-11732 A | 1/2010 |
| JP | 2010-176939 A | 8/2010 |
| JP | 2011-256413 A | 12/2011 |
| JP | 2014-95118 A | 5/2014 |

HYDROGEN PRODUCTION SYSTEM AND METHOD FOR PRODUCING HYDROGEN

CROSS-REFERENCE TO RELATED APPLICATION

This application is based upon and claims the benefit of priority from Japanese Patent Application No. 2014-223044, filed on Oct. 31, 2014, the entire contents of which are incorporated herein by reference.

BACKGROUND

Technical Field

Embodiments described herein relate generally to a hydrogen production technique for producing hydrogen by using a high temperature electrolysis.

Description of the Related Art

Realization of a hydrogen energy society using hydrogen as an energy medium is attracting attention. A high temperature electrolysis method is widely known as one of techniques for producing hydrogen. The high temperature electrolysis method is a method for generating hydrogen and oxygen through an electrolysis of high temperature steam.

This method has an advantage that, because steam is electrolyzed in a high temperature environment, an amount of electricity necessary for the electrolysis can be reduced compared with an electrolysis of water. Owing to this feature, the same amount of hydrogen production can be obtained with electric power that is smaller by about 30% than that in the electrolysis of water at a room temperature, and hence the hydrogen production can be performed with high energy efficiency.

Because a raw material is water, if electricity based on renewable energy without generation of carbon dioxide and a heat source without generation of carbon dioxide are used, the hydrogen production can be achieved without no emission of carbon dioxide.

The following three methods are known as a hydrogen storage method for temporarily storing produced hydrogen: (1) hydrogen is compressed to a high-pressure hydrogen gas; (2) hydrogen is made into liquid hydrogen; and (3) hydrogen is occluded by a hydrogen storage material. Of these methods, the method of compressing the produced hydrogen into high pressure hydrogen gas enables easy storage and transport of hydrogen, and thus is widely prevalent.

Up to now, a technique for improving heat efficiency in an entire system by combining a hydrogen production technique and a hydrogen storage technique with each other has been studied.

For example, Patent Document 1 (Japanese Patent Laid-Open No. 2004-197705) discloses a technique including: a hydrogen production system that produces hydrogen; a hydrogen compression system that compresses the produced hydrogen up to a predetermined pressure; a hydrogen supply system that supplies the compressed high pressure hydrogen to a hydrogen consumption engine; and a combustion-turbine power generation system that covers the entirety or a part of electric power consumed by the supply system of the high pressure hydrogen. In this technique, the entirety or a part of an amount of heat required for a dehydrogenation reaction is covered using high temperature gas emitted by the combustion-turbine power generation system as a heat source.

Patent Document 2 (Japanese Patent Laid-Open No. 2009-221045) discloses a power generation-hydrogen production system including: a power generation-hydrogen pump combination member that produces hydrogen gas or generates electric power using reformed gas as a raw material; a hydrogen gas supply system that sequentially supplies high pressure hydrogen gas obtained by compressing the produced hydrogen, to a hydrogen tank of a fuel cell vehicle; a hot-water supply system that supplies hot water utilizing waste heat generated along with the power generation by the power generation-hydrogen pump combination member; and an inverter capable of converting the electric power generated by the power generation-hydrogen pump combination member and selling the electric power to a commercial power supply or outputting an electricity load to a house.

In the hydrogen storage method of compressing the produced hydrogen into high pressure hydrogen gas, heat is generated when the hydrogen is compressed. In conventional techniques, cooling is performed when hydrogen is compressed, and thermal energy generated when the hydrogen is compressed is not effectively utilized to improve hydrogen production efficiency (which is obtained by dividing an amount of hydrogen production or an amount of combustion heat of the produced hydrogen by an amount of heat input).

SUMMARY

Embodiments of the present invention have been implemented in view of the above circumstances and have an object to provide a hydrogen production technique capable of reducing an amount of heat input concerning hydrogen production to improve hydrogen production efficiency.

A hydrogen production system according to an embodiment of the present invention includes: a steam generator heating supplied raw water and generating steam; an electrolytic cell receiving the steam and generating hydrogen and oxygen through a high temperature electrolysis; a cooling unit cooling an unreacted part of the steam in the high temperature electrolysis and changing the unreacted part of the steam into steam condensate; a gas/liquid separator performing gas/liquid separation on the generated hydrogen and the generated steam condensate; a hydrogen compression unit compressing the separated hydrogen and transmitting thermal energy generated when the hydrogen is compressed, to the raw water; and a hydrogen storage unit storing the compressed hydrogen.

A method for hydrogen production according to an embodiment of the present invention includes: heating supplied raw water and generating steam; receiving the steam and generating hydrogen and oxygen through a high temperature electrolysis; cooling an unreacted part of the steam in the high temperature electrolysis and changing the unreacted part of the steam into steam condensate; performing gas/liquid separation on the generated hydrogen and the generated steam condensate; compressing the separated hydrogen and transmitting thermal energy generated when the hydrogen is compressed, to the raw water; and storing the compressed hydrogen.

DETAILED DESCRIPTION

The present embodiments are described hereinafter with reference to the accompanying drawings. The embodiments of the present invention provide a hydrogen production technique capable of reducing an amount of heat input concerning hydrogen production to improve hydrogen production efficiency.

(First Embodiment)

Figure 1:
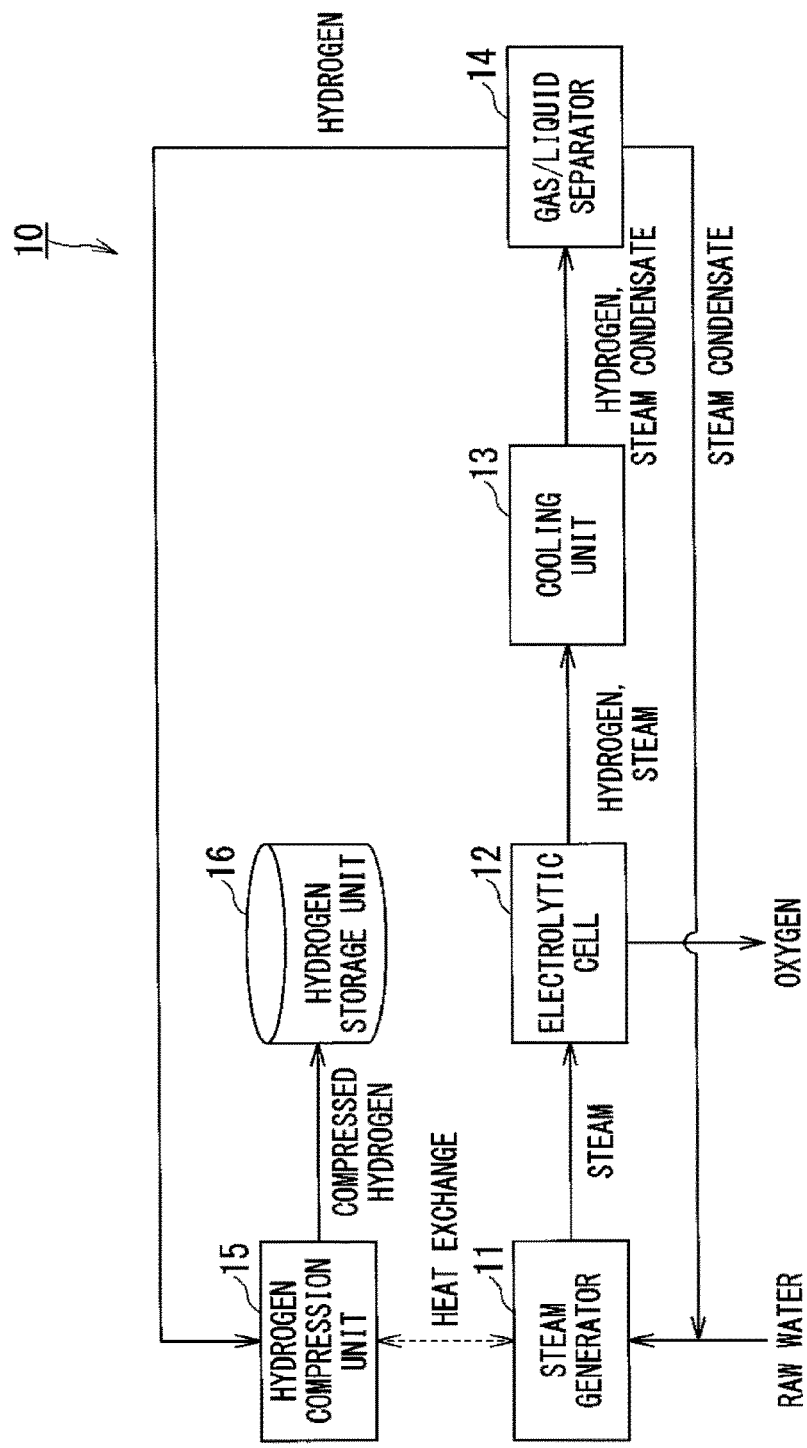
FIG. 1 is a configuration diagram of a hydrogen production system according to a first embodiment.

As illustrated in FIG. 1, a hydrogen production system 10 according to a first embodiment includes: a steam generator 11 heating supplied raw water and generating steam; an electrolytic cell 12 that receiving the steam and generating hydrogen and oxygen through a high temperature electrolysis; a cooling unit 13 cooling an unreacted part of the steam in the high temperature electrolysis and changing the unreacted part of the steam into steam condensate; a gas/liquid separator 14 that performing gas/liquid separation on the generated hydrogen and the generated steam condensate; a hydrogen compression unit 15 compressing the separated hydrogen and transmitting thermal energy generated when the hydrogen is compressed, to the raw water; and a hydrogen storage unit 16 storing the compressed hydrogen.

The steam generator 11 heats and evaporates the supplied raw water, and increases a temperature of the steam up to a temperature (700° C. or higher) suitable for the high temperature electrolysis. In FIG. 1, the steam generator 11 is configured as one unit, but may be configured as multiple-stage units connected in series.

In the electrolytic cell 12, a solid oxide electrolyte (omitted in FIG. 1) is arranged in a center, and a hydrogen pole and an oxygen pole are formed on both sides of the solid oxide electrolyte.

Voltage is applied to the electrolytic cell 12 from an outside, and the steam is caused to flow into the electrolytic cell 12 from the steam generator 11, whereby the electrolytic cell 12 generates hydrogen and oxygen through the high temperature electrolysis.

The oxygen generated at the oxygen pole of the electrolytic cell 12 is emitted to an outside of the system, whereas the hydrogen generated at the hydrogen pole thereof and the unreacted part of the steam are outputted to the cooling unit 13. The electrolytic cell 12 may include a heater for keeping a temperature in the cell at a high temperature.

The cooling unit 13 receives the hydrogen generated by the electrolytic cell 12 and the unreacted part of the steam, and cools the same using a held cooling water. As a result, the unreacted part of the steam is condensed into the steam condensate. It is sufficient that the cooling unit 13 can cool the hydrogen generated by the electrolytic cell 12 and the unreacted part of the steam up to a temperature lower than a boiling point of water and, for example, that temperatures thereof become lower than 100° C. in the case of 0 MPa in terms of a gauge pressure.

The raw water to be supplied to the steam generator 11 may be supplied to the steam generator 11 after being utilized as the cooling water by the cooling unit 13. Alternatively, the raw water may be supplied to the steam generator 11 after being mixed with a process fluid from the electrolytic cell 12 to the gas/liquid separator 14 (that is, the hydrogen and the steam or the steam condensate) and cooling the process fluid. Utilizing the raw water supplied to the steam generator 11 as the cooling water can heat the raw water before being supplied to the steam generator 11.

In the case where the raw water to be supplied to the steam generator 11 is utilized as the cooling water, any of a countercurrent mode and a co-current mode may be adopted, but the countercurrent mode is more desirable.

The gas/liquid separator 14 receives the hydrogen and the steam condensate from the cooling unit 13, and separates the hydrogen and the steam condensate from each other. The separated hydrogen is outputted to the hydrogen compression unit 15, whereas the separated steam condensate is caused to join the raw water to be supplied to the steam generator 11.

Gas/liquid separation performance of the gas/liquid separator 14 is improved by providing an outlet of the steam condensate in a gravity acting direction and providing an outlet of the hydrogen in an opposite direction.

The steam condensate separated by the gas/liquid separator 14 may be supplied to the steam generator 11 after being utilized as the cooling water by the cooling unit 13. This enables the steam condensate to be heated before joining the raw water. In the case where the steam condensate is utilized as the cooling water, any of a countercurrent mode and a co-current mode may be adopted, but the countercurrent mode is more desirable.

The hydrogen compression unit 15 receives the hydrogen separated by the gas/liquid separator 14, and compresses the hydrogen up to a predetermined pressure (about 70 MPa). Then, the hydrogen compression unit 15 transmits the thermal energy generated when the hydrogen is compressed, to the raw water to be supplied to the steam generator 11. In FIG. 1, the hydrogen compression unit 15 is configured as one unit, but may be configured as multiple-stage units connected in series.

Example methods for transmitting the thermal energy generated when the hydrogen is compressed include: providing a heat transfer pipe that couples the steam generator 11 and the hydrogen compression unit 15 to each other; and providing a heat exchanger between the steam generator 11 and the hydrogen compression unit 15.

The hydrogen storage unit 16 stores the hydrogen that has been compressed up to the predetermined pressure by the hydrogen compression unit 15.

The thermal energy generated when the hydrogen compression unit 15 compresses the hydrogen is transmitted to the raw water to be supplied to the steam generator 11, in other words, the steam generator 11 and the hydrogen compression unit 15 are caused to exchange heat with each other, whereby thermal energy necessary to heat the raw water can be reduced. Accordingly, heat input concerning hydrogen production can be reduced, so that hydrogen production efficiency can be improved.

Thermal energy based on renewable energy from sunlight, wind power, geothermal heat, and the like may be utilized as heat input to the steam generator 11. Accordingly, heat input to the entire hydrogen production system 10 is further reduced, so that the hydrogen production efficiency is improved.

The steam generator 11 to which the raw water is supplied and the cooling unit 13 that receives the high temperature hydrogen and the unreacted part of the steam may be caused to exchange heat with each other by means of a heat exchanger, whereby the raw water may be heated.

Here, heat efficiency in the hydrogen production system 10 is calculated using specific numerical values. It is assumed that the steam generator 11 and the hydrogen compression unit 15 are each configured as two-stage units connected in series.

In the case where water at 20° C. is evaporated to become steam at 800° C. under conditions that a water flow rate is 50 kg/h and that a pressure is 0.18 MPa, it is assumed that the temperature is increased to 150° C. in the first stage of the steam generator 11 and is increased to 800° C. in the second stage thereof.

Enthalpy of water at 20° C. and 0.18 MPa is 84 kJ/kg, enthalpy of water at 150° C. and 0.18 MPa is 2,770.1 kJ/kg, and enthalpy of water at 800° C. and 0.18 MPa is 4,157.9 kJ/kg (see 1980 SI Steam Pressure Table (edited by The Japan Society of Mechanical Engineers)).

Hence, a change in enthalpy necessary for each of the first stage and the second stage of the steam generator 11 is as shown in Table 1, and an amount of heat necessary to heat the raw water is 56.6 kW in total. A boiling point of water at 0.18 MPa is about 110° C., and the water already becomes steam in the first stage of the steam generator 11.

TABLE 1

Necessary change in enthalpy to evaporate 50 kg/h water

|  | First stage steam generator | Second stage steam generator |
|---|---|---|
| Change in temperature | 20° C.→150° C. | 150° C.→800° C. |
| Necessary change in enthalpy(kW) | 37.3 | 19.3 |

Assuming that steam of 90 mol % becomes hydrogen, hydrogen is generated at 5 kg/h (2.5 kmol/h) with respect to a water flow rate of 50 kg/h (2.78 kmol/h).

In the case where the hydrogen compression unit 15 pressurizes hydrogen to 0.45 MPa in the first-stage compression and to 70 MPa in the second-stage compression from a state of 20° C. and 0.1 MPa, a temperature of the hydrogen, a change in temperature at the time of each compression, and a change in enthalpy for each of the first stage and the second stage are as shown in Table 2, assuming adiabatic compression with an ideal gas.

TABLE 2

Change in enthalpy when 5 kg/h hydrogen is compressed

|  | First stage compression | Second stage compression |
|---|---|---|
| Change in temperature | 20° C.→177° C. | 177° C.→1630° C. |
| Change in enthalpy(kW) | 3.2 | 29.4 |

Assuming that a minimum design temperature difference at the time of heat exchange between the steam generator 11 and the hydrogen compression unit 15 is 20° C., enthalpy generated in the second stage of the hydrogen compression unit 15 can be utilized as heat input necessary to heat the raw water.

Assuming that a heat radiation rate is 0%, heat input necessary to evaporate water is 27.2 kW (=56.6 kW−29.4 kW), and the heat input to the hydrogen production system 10 is reduced, so that the hydrogen production efficiency is improved.

(Second Embodiment)

Figure 2:
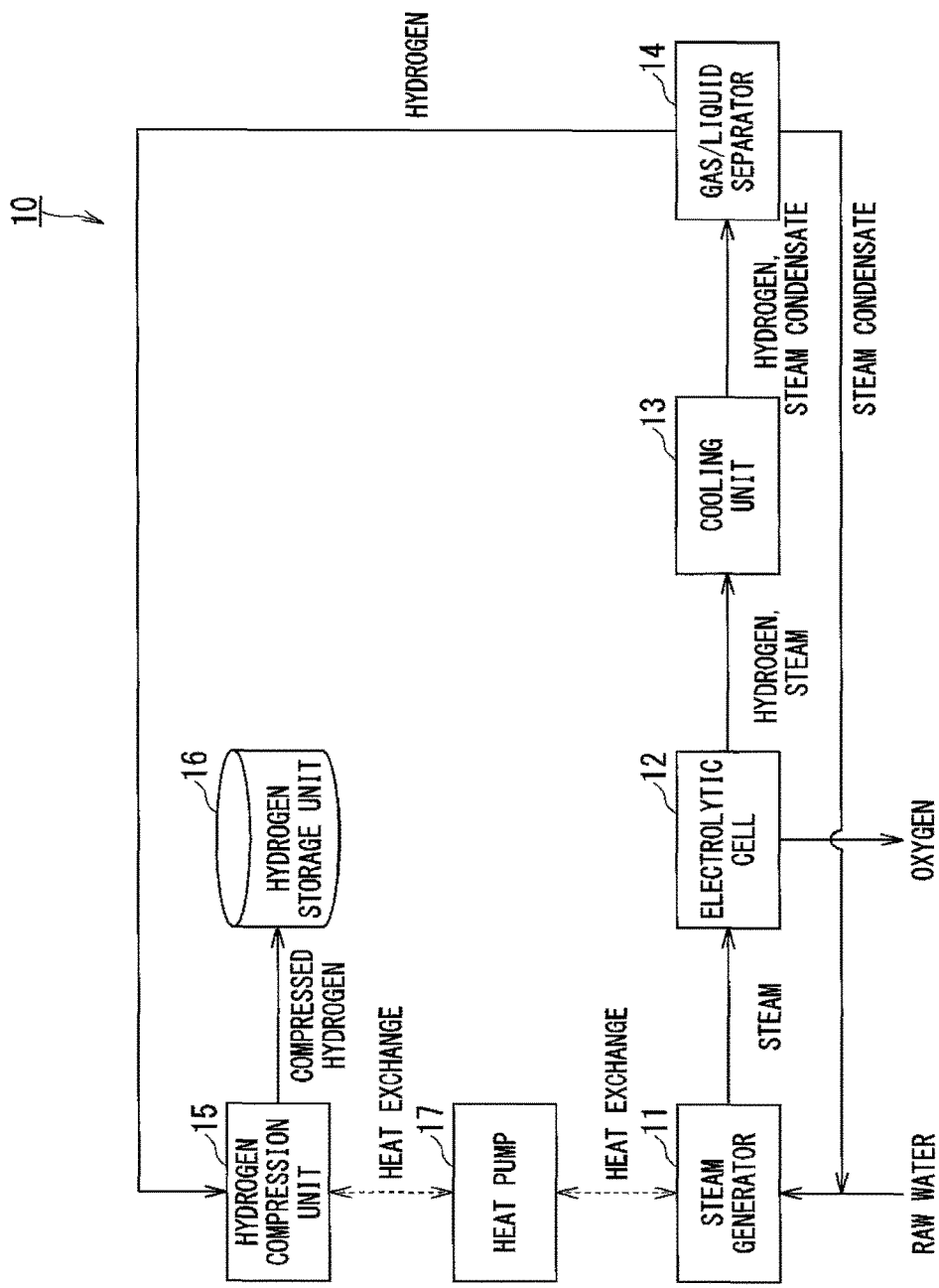
FIG. 2 is a configuration diagram of a hydrogen production system according to a second embodiment.

FIG. 2 is a configuration diagram of a hydrogen production system 10 according to a second embodiment. Configurations and portions corresponding to those of the first embodiment are denoted by the same reference signs, and overlapping description is omitted.

The hydrogen production system 10 of the second embodiment is different from that of the first embodiment in that a heat pump 17 that compresses and expands a refrigerant to thereby transfer thermal energy is further provided between the hydrogen compression unit 15 and the steam generator 11 and that the hydrogen compression unit 15 transmits the thermal energy generated when the hydrogen is compressed, to the raw water with the intermediation of the refrigerant.

The heat pump 17 forms a circulation loop for circulating the refrigerant, and includes a compressor and an expansion valve on the circulation loop. The heat pump 17 compresses and expands the refrigerant to thereby transfer the thermal energy from a low temperature portion to a high temperature portion.

The heat pump 17 is provided between the steam generator 11 and the hydrogen compression unit 15, and the hydrogen compression unit 15 transmits the thermal energy generated when the hydrogen is compressed, to the raw water to be supplied to the steam generator 11 with the intermediation of the refrigerant of the heat pump 17.

In this way, heat exchange is performed by means of the heat pump 17, whereby the heat generated when the hydrogen is compressed can be efficiently transmitted to the raw water.

Here, heat efficiency in the hydrogen production system 10 is calculated using specific numerical values.

Similarly to the conditions for hydrogen production given in the first embodiment, conditions for the raw water are assumed such that a water flow rate is 50 kg/h, that a temperature is 20° C. and that a pressure is 0.18 MPa, conditions for a high temperature electrolysis are assumed such that a temperature is 800° C., that a pressure is 0.18 MPa and that a hydrogen conversion rate is 90 mol %, and conditions for hydrogen compression are assumed such that a hydrogen flow rate is 5 kg/h, that a temperature is 20° C. and that a pressure of 0.1 MPa is compressed to a pressure of 70 MPa.

A coefficient of performance (COP) of the heat pump 17 is assumed as 5. It is assumed that the steam generator 11 and the hydrogen compression unit 15 are each configured as two-stage units connected in series.

If the heat pump 17 having a COP of 5 is used, thermal energy that is generated in the first stage of the hydrogen compression unit 15 and has a low temperature not satisfying a minimum design temperature difference of 20° C. can be utilized as the heat input to the steam generator 11.

If an amount of heat input is calculated using Table 1 and Table 2 described above, an amount of heat input necessary to heat the raw water can be reduced to 24.6 kW (=56.6 kW−29.4 kW−3.2 kW+3.2 kW×1/5) (in the first embodiment, the amount of heat input necessary to heat the raw water is 27.2 kW).

In this way, heat exchange is performed by means of the heat pump 17, whereby the amount of heat input to the hydrogen production system 10 can be more reduced compared with the case where the steam generator 11 and the hydrogen compression unit 15 directly exchange heat with each other.

According to the hydrogen production system of each of the embodiments described above, the steam generator and the hydrogen compression unit are caused to exchange heat with each other, and the supplied raw water is heated by utilizing thermal energy generated when hydrogen is compressed, whereby the heat input to the hydrogen production system 10 can be reduced, so that the hydrogen production efficiency can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the sprit of the inventions. The accompanying claims and their equivalents are intended to cover such forms or modifications as would fall within the scope and sprit of the inventions.

What is claimed is:

1. A hydrogen production system comprising:
   a steam generator configured to heat supplied raw water and generate steam;
   an electrolytic cell configured to receive the steam and generate hydrogen and oxygen through a high temperature electrolysis;
   a cooling unit configured to cool an unreacted part of the steam in the high temperature electrolysis and change the unreacted part of the steam into steam condensate;
   a gas/liquid separator configured to separate the hydrogen from the steam condensate;
   a hydrogen compression unit configured to compress the hydrogen and transmit thermal energy generated, when the hydrogen is compressed, to the raw water;
   a hydrogen storage unit configured to store the compressed hydrogen; and
   a heat pump that is provided between the hydrogen compression unit and the steam generator, the heat pump configured to compress and expand a refrigerant to transfer the thermal energy, wherein
   the hydrogen compression unit is configured to transmit the thermal energy to the raw water with an intermediation of the refrigerant.

2. The hydrogen production system according to claim 1, wherein the raw water to be supplied to the steam generator is utilized as cooling water for cooling the unreacted part of the steam.

3. The hydrogen production system according to claim 1, wherein the steam generator is configured to heat the raw water by using renewable energy.

4. A method for producing hydrogen, comprising the steps of:
   heating supplied raw water and generating steam;
   receiving the steam and generating hydrogen and oxygen through a high temperature electrolysis;
   cooling an unreacted part of the steam in the high temperature electrolysis and changing the unreacted part of the steam into steam condensate;
   performing gas/liquid separation on the generated hydrogen and the generated steam condensate;
   compressing the separated hydrogen and transmitting thermal energy generated when the hydrogen is compressed, to the raw water with the intermediation of a refrigerant, the refrigerant being compressed and expanded by a heat pump to transfer the thermal energy; and
   storing the compressed hydrogen.

* * * * *